March 9, 1948.                E. F. McDONALD, JR                2,437,610
           COMBINED DIAL SCALE, SWITCH OPERATOR, AND POSITION INDICATOR
                        Filed Jan. 21, 1944           2 Sheets-Sheet 1

INVENTOR:
EUGENE F. McDONALD, JR.
BY David M. Davis
HIS ATTORNEY

March 9, 1948.  E. F. McDONALD, JR  2,437,610
COMBINED DIAL SCALE, SWITCH OPERATOR, AND POSITION INDICATOR
Filed Jan. 21, 1944  2 Sheets-Sheet 2
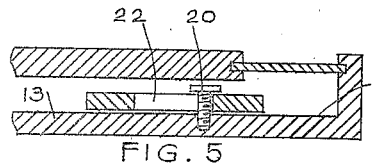
FIG. 5
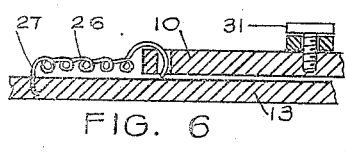
FIG. 6
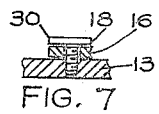
FIG. 7
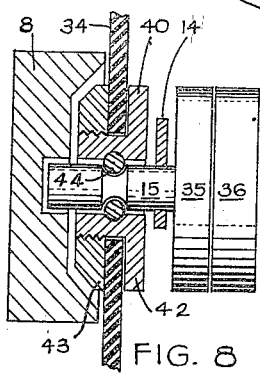
FIG. 8
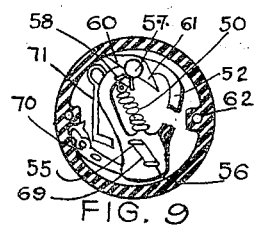
FIG. 9
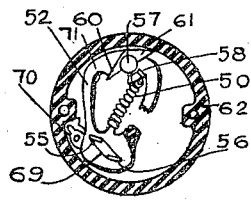
FIG. 10
FIG. 11
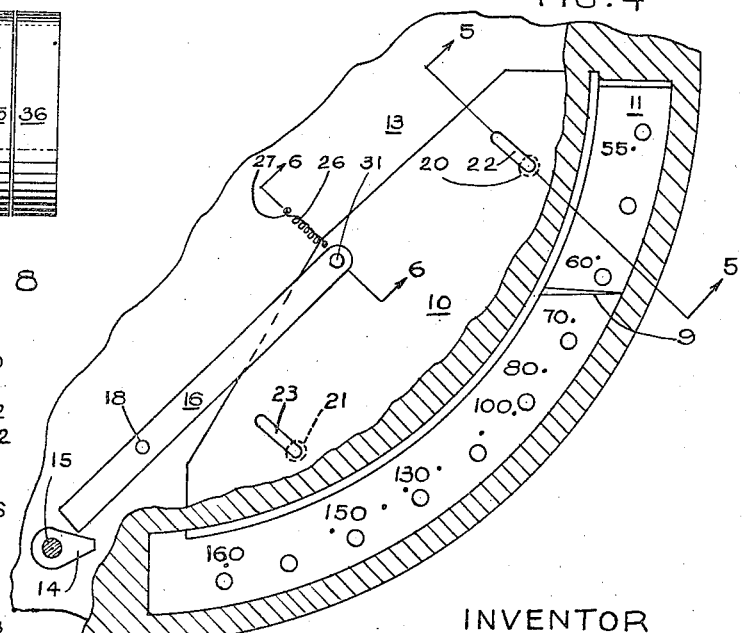
FIG. 3
FIG. 4
INVENTOR
EUGENE F. McDONALD, JR.
BY David M. Davis
HIS ATTORNEY Patented Mar. 9, 1948

2,437,610

UNITED STATES PATENT OFFICE 2,437,610

COMBINED DIAL SCALE, SWITCH OPERATOR, AND POSITION INDICATOR

Eugene F. McDonald, Jr., Chicago, Ill.

Application January 21, 1944, Serial No. 519,245

5 Claims. (Cl. 250—16)

This invention relates to an indicator, and more particularly to an indicating dial arranged to be exposed to view only when associated apparatus is in a predetermined operating condition.

In apparatus having an indicating dial associated therewith, it is sometimes desirable that the dial be exposed to view only under certain operating conditions.

In battery operated apparatus, especially battery operated portable radio receivers, it is desirable that a person operating such apparatus may readily know whether or not current is needlessly flowing from such battery to the device. It is desirable that such person should be made aware of the "on" and "off" condition of the apparatus upon casual glance at the dial of such apparatus. It simplifies operation of the apparatus when it is necessary only that the operator glance casually at the dial to ascertain the operating condition of such apparatus when, for example, he adjusts or attempts to adjust the apparatus.

Furthermore, it is desirable to make the outward appearance and configuration of some types of apparatus, particularly portable radios, of such design as to be pleasing to the eye. Oftentimes this is accomplished by arranging elements, such as the speaker grill, tuning dial, knobs, etc., symmetrically on the apparatus. The dial markings on such apparatus oftentimes spoil its symmetrical appearance. This loss in symmetry due to dial markings is minimized when, in accordance with the present invention, the dial is obscured in certain operating conditions of the apparatus.

Accordingly, an object of the present invention is to provide improved means for indicating the "on" and "off" condition of apparatus.

Another object of the present invention is to provide an improved arrangement of apparatus in which an indicating dial is obscured under certain operating conditions.

Another object of the present invention is to provide means for minimizing the loss of symmetry due to dial markings in certain apparatus.

The features of the present invention which are believed to be novel are set forth with particularity in the appended claims. This invention itself, both as to its organization and manner of operation, together with further objects and advantages thereof, may best be understood by reference to the following description taken in connection with the accompanying drawings, in which:

Figs. 3 and 4 show detail views corresponding respectively to an arrangement of elements embodying the present invention in Figs. 1 and 2;

Figs. 5 to 7, inclusive, are sectional views taken substantially on corresponding lines in Figs. 3 and 4;

Fig. 8 is a view partly in section of apparatus embodying the present invention; and Figs. 9 to 11, inclusive, are detail views of a portion of the apparatus shown in Fig. 8.

Figure 1:
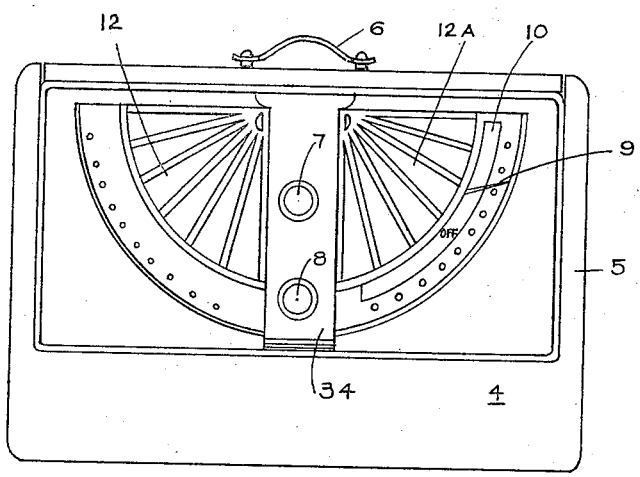
Figures 1 and 2 show apparatus embodying the present invention in different operating conditions.
Figure 2:
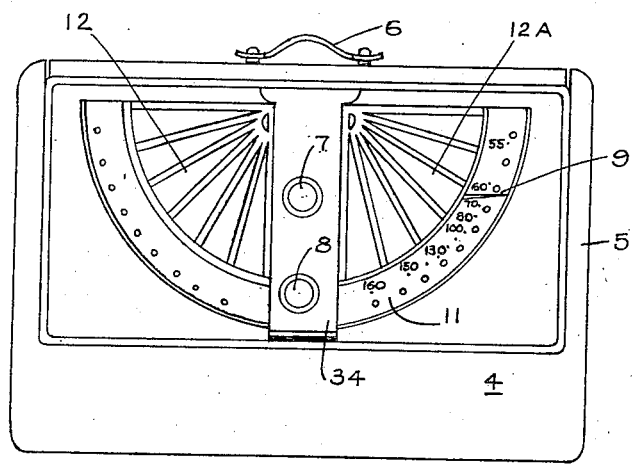

Figs. 1 and 2 show a portable radio receiver 5 arranged to be carried by a handle 6 and having self contained batteries (not shown).

The portable radio receiver 5, having a casing 4, includes a conventional tuning knob 7 and a combination power switch and volume control knob 8 whose operation effects movement of a shutter or indicator 10 over the tuning dial 11 coacting with a movable pointer 9 for indicating the tuned condition of the receiver.

In Fig. 1, the knob 8 is in its position wherein the receiver 5 is completely deenergized corresponding to the position wherein shutter or indicator 10 obscures tuning dial 11.

In Fig. 2, the knob 8 is in a position wherein the receiver 5 is energized and the shutter or indicator 10 is withdrawn from its dial obscuring position and knob 8 is effective to control the volume output of audio signals reproduced by a speaker (not shown) located behind the speaker grill 12.

A false speaker grill 12A mounted symmetrically on casing 4 with respect to speaker grill 12 causes the portable radio receiver 5 to have a pleasing appearance which is disturbed somewhat by the presence of dial 11. Shutter 10 when in the position shown in Fig. 1 restores the symmetrical appearance of the radio apparatus.

In Fig. 3, a combination indicator and dial shutter 10 lies in one of its operating positions wherein the shutter 10 obscures the markings on dial 11 of associated radio apparatus when the radio apparatus is in its inoperative condition.

In Fig. 4, the shutter or indicator 10 is withdrawn so as to allow an operator to view the markings, such as are illustrated on dial 11, when the radio apparatus is in operative condition.

The shutter or indicator 10 is actuated from the position shown in Fig. 3 to the position shown in Fig. 4 when the apparatus of which dial 11 forms a part is switched from "off" position to "on" position, the shutter 10 being actuated to the position shown in Fig. 3 when such apparatus is switched to "off" or inoperative position, and the shutter 10 being actuated to the position shown in Fig. 4 when such apparatus is switched to "on" or operative position.

Shutter or indicator 10 is slidably mounted on dial base 13 and actuated from the position shown in Fig. 4 to the position shown in Fig. 3 by engagement of projection 14 on shaft 15 with pivoted link member 16, the lever or link member 16 being pivoted on a shaft 18 and having one of its ends pivotally connected to shutter 10 and having its other end arranged to be engaged by projection 14 when the apparatus is actuated to "off" or inoperative position.

Shutter or indicator 10 is slidably mounted on dial base 13 by passing a pair of combination guide and stop pins 20 and 21 respectively through a pair of cooperating guide apertures 22 and 23 in indicator 10 and anchoring an end of such guide pins 20 and 21 in dial base 13 with enlarged heads on such pins 20 and 21 limiting upward movement of shutter 10 as shown in Fig. 5.

A tension spring 26, Fig. 6, having one of its ends 27 anchored to dial base 13 and its other end fastened to movable indicator 10 causes it to assume normally the position shown in Fig. 4 with pins 20 and 21 limiting movement of shutter 10.

Lever 16 is pivotally mounted on a shaft 18, Fig. 7, having one of its ends anchored in dial base 13 and having a head 30 for limiting upward movement of lever 16 in Fig. 7. One end of lever 16 is pivotally mounted to shutter 10 by a pin 31 (Fig. 6) passing through lever 16 and anchored in shutter 10.

Projection 14 rigidly mounted on shaft 15 is so positioned on shaft 15 that projection 14 engages lever 16 and causes it to pivot about shaft 18 when knob 8 on shaft 15 is moved to "off" position.

Shaft 15 journaled in the face plate 34 of the radio apparatus has mounted thereon a volume control rheostat 35, an on-off switch 36, projection 14 and a manual control knob 8 for switching on and off the apparatus of which dial 11 forms a part, for controlling the position of shutter or indicator 10, and for controlling, for example, the sound emanating from such apparatus.

Details of the volume control 35 are not shown herein, it being understood that the construction and operation of volume controls or variable resistances of the rotary type are well-known and understood in the art.

Shaft 15, having knob 8 fastened thereto, is rotatably mounted in a bushing 40 which is fastened to face plate 34, face plate 34 being clamped between annular flange 42 and washer 43 screw-threadedly mounted on bushing 40. A circular wire or ring 44 extending into cooperating annular apertures in bushing 40 and shaft 15 prevents movement of shaft 15 in bushing 40 along its axial direction but does allow rotary movement of shaft 15 in bushing 40.

On-off switch 36 is of the conventional type used heretofore in commercial receivers for switching the receiver on and off. Switch 36 is of the snap action type employing a prestressed coil spring 50 for maintaining the switch in its "on" or "off" position, as the case may be. In the present application, spring 50 serves another purpose, that is, it maintains the shutter or indicator 10 in the position shown in Figs. 1 and 3 when switch 36 is in its "off" position. For this purpose, spring 50 produces a force which overcomes the force produced on shutter 10 by spring 26.

Fig. 9 shows the position of spring 50 when switch 36 is in its "off" position corresponding to the position of shutter 10 in Figs. 1 and 3.

Fig. 10 shows the position of spring 50 when switch 36 is in its "on" position corresponding to the position of shutter 10 in Figs. 2 and 4 and when shaft 15 is free to move for effecting changes in resistance 35.

Switch 36 is of a conventional type in which insulating member 52 carrying a pair of electrical contact making members 55 and 56 on its free end is pivotally mounted on post 57 and is connected to lever member 58 through prestressed coil compression spring 50, the lever member 58 being also pivotally mounted on post 57 and having its motion limited by cooperation of one of a pair of projections 60 and 61 with switch casing 62. Lever member 58 has a pair of upstanding projections 65 and 66 (Fig. 11) for forming a channel within which an off-centered projection 67 carried by shaft 15 and movable in a path indicated by the curved line 68 enters and cams lever member 58 from its "on" position to its "off" position and vice versa when and as knob 8 is turned to its "on" and "off" positions. That is, when the apparatus is switched off, projection 67 engages projection 65 and moves spring 50 to a position where it snaps into the position shown in Fig. 9; and, when the apparatus is switched on, projection 67 engages projection 66 and moves spring 50 to a position where it snaps into the position shown in Fig. 10. In conventional manner, when lever member 58 is in its "on" position, shaft 15 and its projection 67 may move to a relatively large angular distance for varying the magnitude of resistance 35 and thus effect, for example, volume control of the radio receiver.

It is understood that when the contact making members 55 and 56 are in the position shown in Fig. 10 corresponding to Figs. 2 and 4, these members 55 and 56 connected by a strap 69 bridge an electrical circuit including fixed contact members 70 and 71 for energizing receiver 5, and that when the contact making members 55 and 56 are in the position shown in Fig. 9 corresponding to Figs. 1 and 3, these members 55 and 56 are in a position where all operating current to the receiver 5 is interrupted.

It is noted that the outward appearance of the portable radio receiver shown in Fig. 1 is pleasing to the eye because of the symmetrical arrangement of elements, and that this symmetrical arrangement is disturbed somewhat by the dial markings in Fig. 2. Another important feature of the present invention is to provide dial or shutter 10 so as to preserve the symmetrical appearance of radio apparatus when in nonoperating condition.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In radio apparatus including a dial scale lying substantially in a plane, and power supply means for said apparatus, said means including a switch arranged upon opening to interrupt the supply of such power, the combination of means for adjustably tuning said apparatus over a range of frequencies and for indicating on said dial scale the frequency to which said apparatus is tuned, a shutter movable in a direction substantially parallel to said plane from a position exposing said scale to a position obscuring said scale, and means for substantially simultaneously moving said shutter through said scale obscuring position and opening said switch, said shutter being arranged in scale obscuring position to give obvious indications of the interruption of the supply of such power to said apparatus.

2. In radio apparatus including a dial scale lying substantially in a plane and along the arc of a circle in such plane, and power supply means for said apparatus, said means including a switch arranged upon opening to interrupt the supply of such power, the combination of means for adjustably tuning said apparatus over a range of frequencies and indicating on said dial scale the frequencies with which said apparatus is tuned, a shutter in the form of an arc of a circle, said shutter being arranged adjacent said scale for movement in a direction substantially parallel to said plane and substantially along a radius of one of said circles between a position exposing said scale and a position obscuring said scale, and means for substantially simultaneously moving such shutter to said scale obscuring position and opening said switch, said shutter in said scale obscuring position being arranged to give obvious indication of interruption of the supply of such power.

3. In radio apparatus including a dial scale lying substantially in a plane, and power supply means for said apparatus, said means including a switch arranged upon opening to interrupt the supply of such power, the combination of means for adjustably tuning said apparatus over a range of frequencies and for indicating on said dial scale the frequency to which said apparatus is tuned, a shutter movable in a direction substantially parallel to said plane from a position exposing said scale to a position obscuring said scale, and means for substantially simultaneously moving said shutter through said scale obscuring position and opening said switch, said shutter being arranged in scale obscuring position to give obvious indications of the interruption of the supply of such power to said apparatus, said shutter moving means including a manual operating knob adjacent one end of said scale, a lever connected with said shutter and extending adjacent said manual operating knob, and a cam arranged to rotate with said knob and to engage said lever to move said lever and shutter.

4. In radio apparatus including a dial scale lying substantially in a plane and along an arc of a circle in said plane, and power supply means for said apparatus, said means including a switch arranged upon opening to interrupt the supply of such power, the combination of means for adjustably tuning said apparatus over a range of frequencies and for indicating on said dial scale the frequencies to which said apparatus is tuned, a shutter arranged in the form of an arc of a circle movable in a direction substantially parallel to said plane from a first position exposing said scale to a second position obscuring said scale, said direction of shutter movement lying along the radius of one of said circles, a spring arranged to bias said shutter toward said first position, and means for substantially simultaneously moving said shutter to said second position and opening said switch to provide obvious indication by obscuration of said scale of the interruption of said power, said shutter moving means comprising a manual operating knob adjacent one end of said scale, a lever connected with said shutter and extending adjacent said knob, and a cam connected with said knob and arranged to engage said lever, and through said lever to move said shutter against the bias of said spring to said second position.

5. In radio apparatus including a dial scale in the form of an arc of a circle arranged asymmetrically on said apparatus, and power supply means for said apparatus, said means including a switch arranged upon opening to interrupt the supply of such power, the combination of a shutter substantially in the form of an arc of a circle lying substantially parallel to the plane of said dial scale, said shutter being arranged to move substantially along a radius of the last mentioned circle from a first position exposing said scale to a second position obscuring said scale, said shutter in said second position having a configuration symmetrical with the remaining parts of said apparatus, a spring arranged to bias said shutter to said first position, and means for substantially simultaneously moving said shutter to said second position and opening said switch, the symmetry of said apparatus with said shutter in said second position giving obvious indication of interruption of said power, and the asymmetry of said apparatus with such shutter in said first position giving obvious indications of the supply of such power to said apparatus, said shutter moving means comprising a manual operating knob adjacent one end of said scale, a lever connected with said shutter and extending adjacent said knob, and a cam connected with said knob and arranged to move against said lever to move said shutter to said second position in response to movement of said knob.

EUGENE F. McDONALD, Jr.

REFERENCES CITED

The following references are of record in the file of this patent:

UNITED STATES PATENTS

| Number | Name | Date |
|---|---|---|
| 374,340 | Marelli | June 9, 1932 |
| 624,278 | Whaley | May 2, 1899 |
| 640,966 | Spaulding | Jan. 9, 1900 |
| 644,304 | Scott | Feb. 27, 1900 |
| 721,410 | Wood | Feb. 24, 1903 |
| 752,531 | Dodge | Feb. 16, 1904 |
| 1,012,066 | Dunbar | Dec. 19, 1911 |
| 1,107,247 | Barr | Aug. 18, 1914 |
| 1,738,172 | Judson et al. | Dec. 3, 1929 |
| 1,744,566 | Mott et al. | Jan. 21, 1930 |
| 2,114,540 | MacNabb | Apr. 19, 1938 |
| 2,159,328 | Horinstein | May 23, 1939 |
| 2,212,315 | Bollack | Aug. 20, 1940 |